United States Patent Office 3,428,537
Patented Feb. 18, 1969

3,428,537
PROCESS FOR THE MANUFACTURE OF B-NOR- OR B-NOR-19-NOR-ANDROSTANES
Oskar Jeger, Zollikerberg, Zurich, Kurt Schaffner, Zurich, and Hans Ueli Wehrli, Schaffhausen, Switzerland, assignors to Ciba Corporation, New York, N.Y., a corporation of Delaware
No Drawing. Filed Sept. 21, 1965, Ser. No. 489,043
Claims priority, application Switzerland, Oct. 2, 1964, 12,834
U.S. Cl. 204—158    8 Claims
Int. Cl. B01j 1/10

The present invention provides a new process for the manufacture of B-nor- or B-nor-19-norandrostanes.

B-norandrostanes are known; thus, for example, F. Sorm (Coll. Czech. 25, page 1086 [1960]) produced B-nortestosterone acetate by a multi-stage, relatively complicated process. The present invention is based on the observation that B-norandrostanes can be obtained by a simple, single-stage process that is easy to perform on an industrial scale, wherein $\Delta^4$-3-oxo-6,7-oxidoandrostanes are irradiated with ultraviolet light, whereby they are transformed into 6-unsubstituted $\Delta^4$-3-oxo-B-norandrostanes. In this conversion $\Delta^4$-3-oxo-6-formyl-B-norandrostanes are presumably formed as intermediates.

Accordingly, the process of the present application is characterized by the fact that a $\Delta^4$-3-oxo-6,7-oxidoandrostane or its 19-nor derivative in a solvent is irradiated with ultraviolet light.

The present process is illustrated by the following scheme of partial formulae:

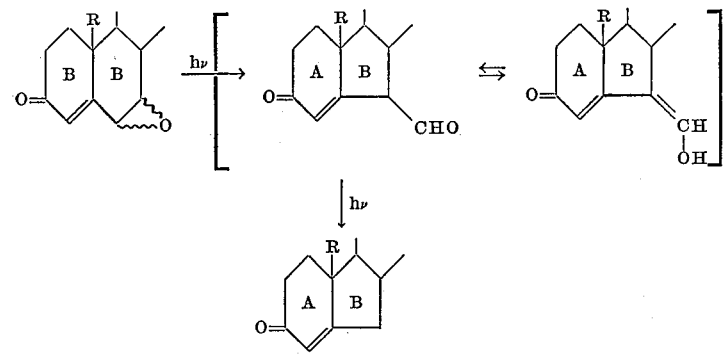

where R is a hydrogen atom or a methyl group.

The $\Delta^4$-3-oxo-6,7-oxidoandrostanes and their 19-nor derivatives used as starting materials are known or can be prepared in the known manner from suitable $\Delta^{4,6}$-3-oxo-androstanes or $\Delta^{4,6}$-3-oxo-19-norandrostanes, for example by treatment with a per-acid such as perphthalic, perbenzoic or meta-chloro-perbenzoic acid.

The irradiation according to this invention is advantageously carried out in an organic solvent, for example in an aliphatic or cycloaliphatic hydrocarbon such as pentane, hexane, cyclohexane or methylcyclohexane, or in an aromatic hydrocarbon such as benzene or toluene. Particularly suitable solvents are aliphatic and cyclic ethers, above all dioxane.

A suitable source of light is artificial or strong natural light. Preferred use is made of ultraviolet light such as is generated by mercury low-pressure burners. The irradiation is advantageosuly performed at a temperature ranging from 0° to +80° C.

The irradiation according to this invention gives rise to the afore-mentioned 6-unsubstituted $\Delta^4$-3-oxo-B-norandrostanes, but also to $\Delta^4$-3,6-dioxo and $\Delta^4$-3,7-dioxo-androstanes. The proportion of these compounds contained in the irradiation product depends substantially on the irradiation and temperature conditions.

The $\Delta^4$-3-oxo-6,7-oxidoandrostanes used as starting materials in the present process as well as the corresponding 19-nor compounds may contain in addition to the aforementioned groupings further substituents in one or several of positions 1, 2, 8, 9, 11, 12, 14, 15, 17, 18 and 19, such as alkyl (for example methyl) groups and/or halogen atoms, functionally converted hydroxyl groups such as esterified or etherified hydroxyl groups, or free or functionally modified oxo groups, above all ketalized oxo groups. The starting materials may further contain double bond.

Preferred starting materials are androstane compound of the formula

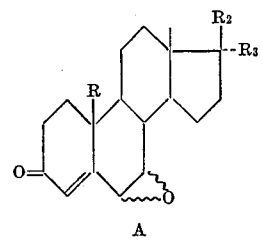

A where $R_1$ represents a hydrogen atom or a methyl group, $R_2$ a free, esterified or etherified hydroxyl group and $R_3$ a hydrogen atom or a lower aliphatic hydrocarbon residue.

The substances contained in the crude irradiation product can be isolated by known methods, above all by crystallization and chromatography, especially on silica gel, if desired after preliminary conversion into functional derivatives, such as esters or ethers of the hydroxyl compounds or ketals.

Protective groups, such as functionally converted hydroxyl or oxo groups, present in the process products may be liberated in the known manner at any stage of the process. Thus, for example, ketal groups and ether groups can be liberated by treatment with a dilute acid such as acetic acid, and esterified hydroxyl groups by alkaline hydrolysis. On the other hand, process products containing free hydroxyl groups can be converted into their ethers or esters in the known manner. Suitable acid components for the formation of esters are primarily aliphatic, cycloaliphatic, araliphatic, aromatic and heterocyclic carboxylic acids containing 1 to 15 carbon atoms, for example formic, acetic, propionic, butyric, valeric, trimethylacetic, caproic, oenanthic, capric, undecyclic, cyclopentylpropionic, hexahydrobenzoic, phenylpropionic, benzoic, furoic or undecylenic acid.

It is further possible to introduce double bonds, for example in 1,2-position, or to reduce oxo to hydroxyl groups, or to dehydrogenate hydroxyl to oxo groups in the known manner in the process products at any stage.

More especially, a 17-oxo group can be reduced to a 17β-hydroxyl group in the known manner, for example with the aid of a complex metal hydride, such as lithium aluminium hydride or sodium borohydride, or with simultaneous introduction of a lower aliphatic hydrocarbon residue in position 17α by means of an organometal compound of the Grignard type.

Preferred process products are the 6-unsubstituted $\Delta^4$-3-oxo-B-norsteroids corresponding to the above starting materials of the formula A; some of them, such as the above-mentioned B-nortestosterone acetate and its 17α-methyl derivative, are already known. Both these compounds and the other 6-unsubstituted $\Delta^4$-3-oxo-B-norandrostenes corresponding to the starting materials of the formula A display an antiandrogenic action.

The following example illustrates the present process.

Example

A mixture of 1 g. of 3-oxo-6,7-oxido-17β-acetoxy-$\Delta^4$-androstene and 100 ml. of dioxane is irradiated for 1½ hours with a mercury low-pressure burner NN 30/89 of Quarzlampen GmbH, Hanau. The material subjected to this irradiation is lodged in a quartz spiral about 14 cm. long, having a diameter of about 3 mm., which surrounds the burner concentrically and is cooled from the outside with water to about 30° C. (This apparatus can also be used for continuous irradiation, the material to be irradiated being pumped through the quartz spiral at the speed required for total conversion.) The reaction solution is then evaporated under vacuum. The residue is dissolved in 5 ml. of a 4:1-mixture of benzene and ethyl acetate and kept overnight at room temperature, during which 180 mg. of 7-oxo-B-nor-testosterone acetate crystallize out which melts at 235° C. after two recrystallizations from acetone+hexane. [α]$_D$=—30° (c.=0.30, in pyridine). Infrared spectrum: $\nu_{max}$=1725, 1688, 1612, 1255 cm.$^{-1}$ (chloroform). Ultraviolet spectrum:

$$\lambda_{max} = 322\ m\mu$$

($\epsilon$=17,000 in ethanol). $\lambda_{max}$=392 m$\mu$ ($\epsilon$=71,000 in 0.01 N-potassium hydroxide solution in ethanol).

The benzene+ethyl acetate-(4:1)-mother liquor is evaporated and chromatographed on 50 times its own weight of silica gel below 0.08 mm. (Merck). A 4:1-mixture of benzene and ethyl acetate first elutes 30 mg. of 3,6-dioxo-17β-acetoxy-$\Delta^4$-androstene in yellow crystals which melt at 201° C. after two recrystallizations from acetone+hexane. Infrared spectrum: $\nu_{max}$=1730, 1680, 1640, 1255 cm.$^{-1}$ (chloroform). Ultraviolet spectrum: $\lambda_{max}$=254 m$\mu$ ($\epsilon$=11,500 in ethanol). Subsequent 4:1-fractions of benzene+ethyl acetate furnish 275 mg. of B-nor-testosterone acetate melting at 134° to 135° C. (after two recrystallizations from acetone+hexane). Identification is carried out by the mixed melting point test, the infrared and ultraviolet spectra and the thin-layer chromatogram (eluant: 4:1 benzene+ethyl acetate).

The starting material is manufactured in the following manner:

5.4 g. of solid meta-chloroperbenzoic acid of 85% strength are stirred portionwise into a solution of 6 g. of 3-oxo-17β-acetoxy-$\Delta^{4,6}$-androstadiene in 200 ml. of chloroform, and the reaction mixture is then refluxed for 2 hours. The reaction solution is then diluted with ether and successively washed with aqueous potassium iodide solution and sodium thiosulphate solution, water, ice-cold 2 N-sodium hydroxide solution and once more with water. The organic phase is then dried and evaporated under vacuum, to yield 6.22 g. of an amorphous crude product which is chromatographed on 100 times its own weight of silica gel (Merck 0.05 to 0.2 mm.) in a 4:1-solution of benzene+ethyl acetate.

At first, 481 mg. of 3-oxo-4,5-oxido-17β-acetoxy-$\Delta^6$-androstene are eluted, melting at 136° C. after one recrystallization from acetone+hexane. [α]$_D$=—111° (c.=0.38 in chloroform). Ultraviolet spectrum: final absorption. Infrared spectrum: $\nu_{max}$=1723, 1707, 1255 cm.$^{-1}$ (chloroform).

Subsequent benzene+ethyl acetate (4:1) fractions (440 mg.) consist of 3-oxo-4,5; 6,7-dioxo-17β-acetoxyandrostane melting at 213° to 214° C. (after one recrystallization from acetone+hexane). [α]$_D$=—69° (c.=0.46 in chloroform). Ultraviolet spectrum: no bands. Infrared spectrum: $\nu_{max}$=1722, 1708, 1255 cm.$^{-1}$ (chloroform).

Subsequent benzene+ethyl acetate (4:1) fractions yield 3 g. of 3-oxo-6,7-oxido-17β-acetoxy-$\Delta^4$-androstene, melting at 161° to 163° C. after one recrystallization from acetone+hexane. [α]$_D$=+33° (c.=0.62 in chloroform). Ultraviolet spectrum: $\lambda_{max}$=240 m$\mu$ ($\epsilon$=15,600 in ethanol). Infrared spectrum: $\nu_{max}$=1725, 1666, 1620, 1250 cm.$^{-1}$ (chloroform).

What is claimed is:

1. Process for the preparation of B-nor- or B-nor-19-norandrostanes, wherein a 3-oxo-6,7-oxido-$\Delta^4$-androstane or its 19-nor derivative in a solvent is irradiated with ultraviolet light.

2. Process as claimed in claim 1, wherein the irradiation is carried out in an organic solvent.

3. Process as claimed in claim 1, wherein the irradiation is carried out in a hydrocarbon.

4. Process as claimed in claim 1, wherein the irradiation is carried out in an ether.

5. Process as claimed in claim 1 wherein the irradiation is carried out in dioxane.

6. Process as claimed in claim 1, wherein the irradiation is carried out at a temperature ranging from 0° to +80° C.

7. Process as claimed in claim 1, wherein the starting material is an androstane of the formula

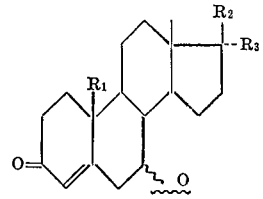

in which $R_1$ represents a hydrogen atom or a methyl group, $R_2$ a free, esterified or etherified hydroxyl group and $R_3$ a hydrogen atom or a lower aliphatic hydrocarbon residue.

8. Process as claimed in claim 7, wherein 6,7-oxidotestosterone-17β-acetate is used as starting material.

References Cited

UNITED STATES PATENTS 3,247,191   4/1966   Wettstein et al. _____ 204—158

HOWARD S. WILLIAMS, *Primary Examiner.*